Jan. 5, 1926.
M. J. MOHAN
MILK CAN
Filed Feb. 7, 1924
1,568,176
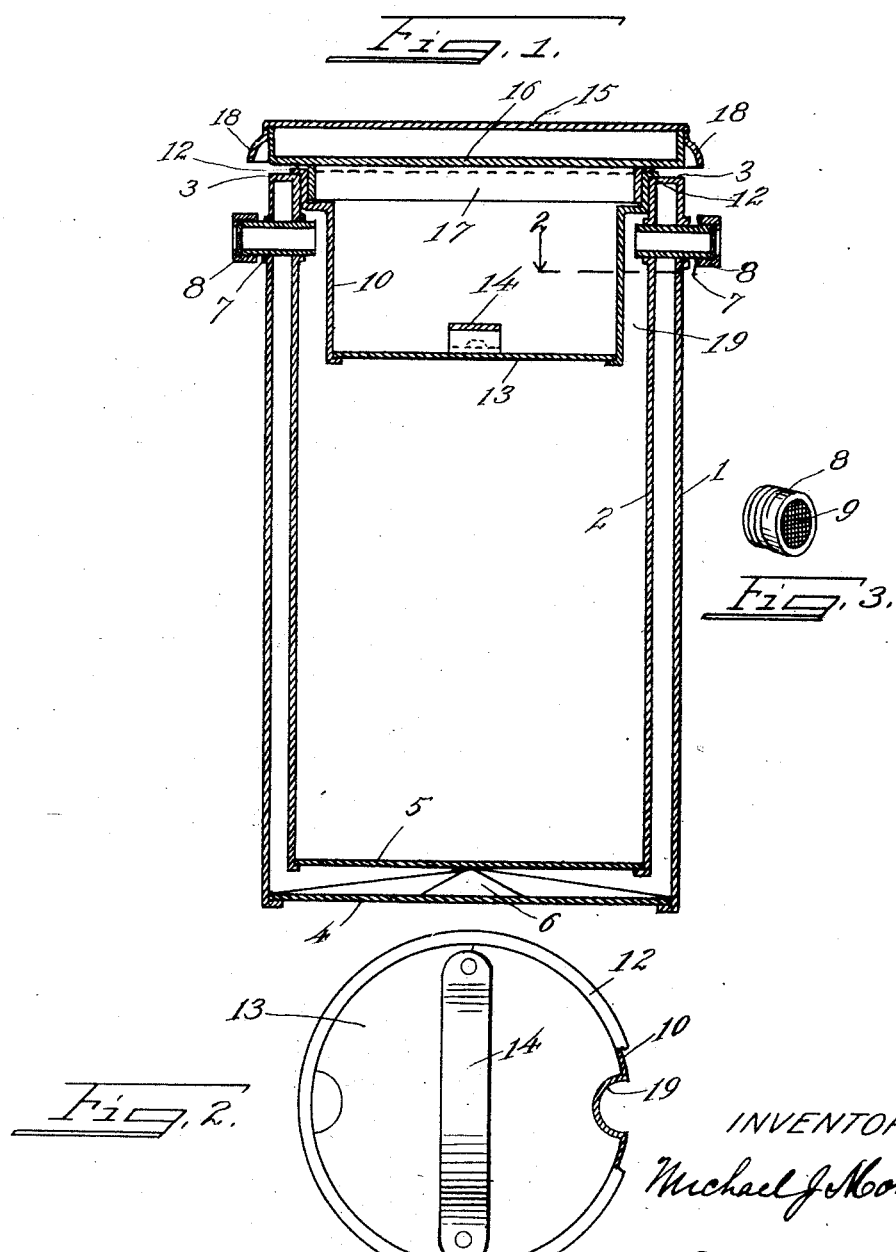
INVENTOR:
Michael J. Mohan
BY Allen & Allen
ATTORNEYS.

Patented Jan. 5, 1926.

1,568,176

UNITED STATES PATENT OFFICE.

MICHAEL J. MOHAN, OF COVINGTON, KENTUCKY.

MILK CAN.

Application filed February 7, 1924. Serial No. 691,118.

*To all whom it may concern:*

Be it known that I, MICHAEL J. MOHAN, a citizen of the United States, and a resident of Covington, in the county of Kenton and State of Kentucky, have invented certain new and useful Improvements in Milk Cans, of which the following is a full, clear, and exact description, reference being had to the accompanying drawing, forming part of this specification.

The object of my invention is to provide a can for the transportation of milk which shall be provided with double walls with air insulation throughout that an even temperature may be maintained for the milk at all times, and which shall be provided with a double top, one inside the other, in order to provide a chamber for ice for cooling purposes.

The can is also provided with suitable screen protected air vents to allow for passage of the animal heat from the milk, and is effectively covered to prevent the entrance of any kind of foreign material, and can be readily and easily cleaned in all its parts, and easily repaired.

The invention consists of that certain novel construction and arrangement of parts to be hereinafter more particularly pointed out and claimed, whereby the above results are attained.

In the drawing:

Figure 1 is a central vertical section of my improved can.

Figure 2 is a top plan view of the inner cover partially broken away.

Figure 3 is a perspective view of one of the screened caps for the air vents.

The main body of the can comprises two preferably cylindrical vessels with side walls 1 and 2 and bottoms 4 and 5, one placed inside the other, and soldered or otherwise secured together with a flat top 3. Braces 6 are provided to support the inner vessel in place.

At the upper end of the can preferably on opposite sides, tubes 7, 7, are inserted through the double walls, for the purpose of supplying proper air circulation for the milk, cream or other liquid, and these tubes are provided with screw caps 8 with replaceable wire screening 9, so as to permit the caps to be easily removed for cleaning the wire mesh, and for the replacement of the screening when desired.

The cover for the can is made in two separable parts.

The inner cover is formed of a cylinder 10 with a flange 12 at the top to rest on the top of the can, and provided with a sealed bottom 13 supplied with a handle 14 and the receptacle thus formed is for ice or other cooling medium for the milk. To cover the ice receptacle and form a suitable flat top for the entire receptacle, I provide a top cover with double walls 15 and 16, and with an annular flange 17 to seat down inside the inner cover. This top is provided with handles 18 for removing the top to gain access to the ice receptacle, and these handles being arranged over the air vents serve to protect them from drippings.

In order to permit the inner cover to pass the ends of the vent tubes 7, a semi-circular recess 19 is formed in the cylindrical wall of the inner cover on each side, and this recess is sufficiently large to permit ample air circulation with the body of milk in the main receptacle, while the construction also keeps the cover in proper place, and ensures its proper insertion.

It will be obvious from the foregoing description that with the double walls and a complete air chamber surrounding the inner receptacle, that the milk can be kept of uniform temperature, and that it will be properly ventilated. A convenient accessible receptacle for ice is provided which is effectively insulated by the double walled top. Moreover the cover parts being separable, and the main milk receptacle being entirely open for the full diameter of the can, the parts can be readily and easily kept clean. When the fresh milk or cream is filled into the can and the cover replaced, the ice receptacle acts as a pump plunger and forces out through the vents animal heat or the impure air in the can.

Having thus described my invention, what I claim as new and desire to secure by Letters Patent, is:—

1. In a device of the character specified, the combination with a main cylindrical receptacle open at the top the full diameter of the vessel and having a double wall throughout with an intermediate sealed air space between the walls, of a double closure for the vessel comprising an inner depending vessel for ice to fit the main cylinder, flanged to rest on the open top, and provided with semi-circular recesses on opposite sides with tubular air vents opening into said recesses and extending through the double walls of the main receptacle to permit air circulation without passage through the ice receptacle.

2. In a device of the character specified, the combination with a main cylindrical receptacle open at the top the full diameter of the vessel and having a double wall throughout with an intermediate sealed air space between the walls, of a double closure for the vessel comprising an inner depending vessel for ice to fit the main cylinder, flanged to rest on the open top, and provided with semi-circular recesses on opposite sides with tubular air vents opening into said recesses and extending through the double walls of the main receptacle to permit air circulation without passage through the ice receptacle, said ice receptacle provided with a flat cover flanged to fit within the receptacle and provided with double walls with space for air insulation whereby complete insulation for the milk and ice body is maintained.

MICHAEL J. MOHAN.